United States Patent
Jeong et al.

(10) Patent No.: US 10,158,752 B2
(45) Date of Patent: *Dec. 18, 2018

(54) APPARATUS AND METHOD FOR AUTOMATICALLY DETECTING PRESENCE OF EXTERNAL DEVICE IN MOBILE TERMINAL

(71) Applicant: GOLDPEAK INNOVATIONS INC, Seoul (KR)

(72) Inventors: Kil-Ho Jeong, Seoul (KR); Cheul-Hong Kim, Seoul (KR)

(73) Assignee: GOLDPEAK INNOVATIONS INC, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,018

(22) Filed: Aug. 8, 2017

(65) Prior Publication Data

US 2017/0339269 A1 Nov. 23, 2017

Related U.S. Application Data

(63) Continuation of application No. 14/929,965, filed on Nov. 2, 2015, now Pat. No. 9,729,699, which is a
(Continued)

(30) Foreign Application Priority Data

Apr. 17, 2003 (KR) .................. 10-2003-0024455

(51) Int. Cl.
*H04B 1/38* (2015.01)
*H05K 11/00* (2006.01)
(Continued)

(52) U.S. Cl.
CPC ..... *H04M 1/72563* (2013.01); *H04M 1/0202* (2013.01); *H04M 1/0254* (2013.01);
(Continued)

(58) Field of Classification Search
CPC ............ H04M 1/0254; H04M 1/0258; H04M 1/6058; H04M 1/72527; H04M 2250/12; H04B 1/401; H04B 2203/5483
(Continued)

(56) References Cited

U.S. PATENT DOCUMENTS 4,792,986 A 12/1988 Garner et al.
5,596,638 A 1/1997 Paterson et al.
(Continued)

FOREIGN PATENT DOCUMENTS

EP 0946067 A2 9/1999
EP 1199867 4/2002
(Continued)

OTHER PUBLICATIONS

Korean Office Action dated Dec. 20, 2004 by the Korean Intellectual Property Office in Korean Patent Application No. 10-2003-0024455.
(Continued)

*Primary Examiner* — Quochien B Vuong

(57) ABSTRACT

An apparatus to control an external device includes a connector to electrically connect with the external device, a connection detector to determine whether the external device is electrically connected to the connector, and a controller to obtain level information corresponding to the external device from the connector, to deter mine a type of the external device based on the level information, and to control execution of a function of the apparatus based on the determined type, wherein the level information is different according to the type of the external device.

6 Claims, 3 Drawing Sheets

Related U.S. Application Data continuation of application No. 14/196,273, filed on Mar. 4, 2014, now Pat. No. 9,178,982, which is a continuation of application No. 13/746,125, filed on Jan. 21, 2013, now Pat. No. 8,699,987, which is a continuation of application No. 12/625,191, filed on Nov. 24, 2009, now Pat. No. 8,374,572, which is a continuation of application No. 10/749,788, filed on Dec. 30, 2003, now Pat. No. 7,643,815.

(51) Int. Cl.
| H04M 1/725 | (2006.01) |
| H04M 1/60 | (2006.01) |
| H04N 5/225 | (2006.01) |
| H04N 5/232 | (2006.01) |
| H04M 1/02 | (2006.01) |

(52) U.S. Cl.
CPC ..... *H04M 1/6058* (2013.01); *H04M 1/72527* (2013.01); *H04N 5/2256* (2013.01); *H04N 5/23209* (2013.01)

(58) Field of Classification Search
USPC .... 455/90.1, 90.2, 90.3, 344, 347, 348, 349, 455/350, 556.1, 557, 575.1, 575.2
See application file for complete search history.

(56) References Cited

U.S. PATENT DOCUMENTS

| 6,122,369 | A | 9/2000 | Hwang et al. |
| 6,212,402 | B1* | 4/2001 | Rubbmark ....... H03K 19/01806 |
| | | | 455/557 |
| 6,397,087 | B1* | 5/2002 | Kim .................... H04B 1/3877 |
| | | | 455/569.1 |
| 6,594,366 | B1 | 7/2003 | Adams |
| 6,819,942 | B2 | 11/2004 | Aotake et al. |
| 6,961,591 | B2 | 11/2005 | Osano |
| 7,024,230 | B2* | 4/2006 | Curtiss ................ H04M 1/6075 |
| | | | 455/557 |
| 7,515,208 | B1 | 4/2009 | Young |
| 2003/0013484 | A1 | 1/2003 | Nishimura et al. |
| 2003/0104842 | A1 | 6/2003 | Choi et al. |
| 2003/0181200 | A1 | 9/2003 | Iida |
| 2003/0216151 | A1 | 11/2003 | Kitano et al. |
| 2003/0229723 | A1 | 12/2003 | Kangas et al. |

FOREIGN PATENT DOCUMENTS

| JP | 2003-032333 | 1/2003 |
| KR | 20-0276068 | 5/2002 |
| KR | 10-2002-0079717 | 10/2002 |

OTHER PUBLICATIONS

Non-Final Office Action dated Dec. 31, 2007 in U.S. Appl. No. 10/749,788.
Final Office Action dated Jul. 8, 2008 in U.S. Appl. No. 10/749,788.
Non-Final Office Action dated Mar. 6, 2009 in U.S. Appl. No. 10/749,788.
Notice of Allowance dated Aug. 24, 2009 in U.S. Appl. No. 10/749,788.
Non-Final Office Action dated Jun. 11, 2012 in U.S. Appl. No. 12/625,191.
Notice of Allowance dated Oct. 9, 2012 in U.S. Appl. No. 12/625,191.
Non-Final Office Action dated Jun. 28, 2013 in U.S. Appl. No. 13/746,125.
Notice of Allowance dated Nov. 25, 2013 in U.S. Appl. No. 13n46,125.
Non-Final Office Action dated Mar. 3, 2015 in U.S. Appl. No. 14/196,273.
Notice of Allowance dated Jul. 7, 2015 in U.S. Appl. No. 14/196,273.
Non-Final Office Action dated Jun. 30, 2016 in U.S. Appl. No. 14/929,965.
Final Office Action dated Jan. 25, 2017 in U.S. Appl. No. 14/929,965.
Notice of Allowance dated Apr. 4, 2017 in U.S. Appl. No. 14/929,965.

\* cited by examiner

APPARATUS AND METHOD FOR AUTOMATICALLY DETECTING PRESENCE OF EXTERNAL DEVICE IN MOBILE TERMINAL

CROSS-REFERENCE TO RELATED APPLICATIONS

This application is a continuation of U.S. patent application Ser. No. 14/929,965, filed on Nov. 2, 2015 and now issued as U.S. Pat. No. 9,729,699, which is a Continuation of U.S. patent application Ser. No. 14/196,273, filed on Mar. 4, 2014 and now issued as U.S. Pat. No. 9,178,982, which is a Continuation of U.S. patent application Ser. No. 13/746,125, filed on Jan. 21, 2013, now issued as U.S. Pat. No. 8,699,987, which is a Continuation of U.S. patent application Ser. No. 12/625,191, filed on Nov. 24, 2009, now issued as U.S. Pat. No. 8,374,572, which is a Continuation of U.S. patent application Ser. No. 10/749,788, filed on Dec. 30, 2003, now issued as U.S. Pat. No. 7,643,815 and claims priority and the benefit of Korean Patent Application No. 10-2003-0024455, filed Apr. 17, 2003, all of which are hereby incorporated by reference for all purposes as if fully set forth herein.

BACKGROUND

Field

The present invention relates to an apparatus and method for automatically detecting the presence of an external device in a mobile terminal; and, more particularly, to an apparatus and method for automatically detecting the presence of a external device in a jack port of a mobile terminal wherein the external device is automatically enabled without the additional operation of the mobile terminal when plugged into the jack port.

Discussion of the Background

The mobile terminal includes all portable terminals capable of sending and receiving sound, characters and images through mobile channels, for example, a Personal Communication Services (PCS) end, Personal Digital Assistant (PDA) and Smart phone.

Nowadays, most mobile terminals currently on the market have a built-in color Liquid Crystal Display (LCD), making a wide variety of additional functions available to the public. Furthermore, a mobile terminal having a built-in digital camera is now commonplace, largely because a color LCD can be best put into practice in the photograph-related industry.

Until recently, users in general played only a passive role in making choices between functions available in a mobile terminal. Now, it is often the case that the mobile terminal having the built-in digital camera enables a user to capture any image of his choice as well as to transmit an image of his own anytime anywhere to anyone.

On the other hand, as for the use of a built-in digital camera, a device called a strobo comes in handy when the luminescence of a place at which a photograph is to be taken is not suitable for the picture-taking purpose. However, most mobile terminals having the built-in digital camera currently on the market are not equipped with such strobo. It is partly due to a widely-held fallacy that the size of a mobile terminal matters more to consumers than its functionality and practicality when it comes to deciding on what to purchase.

Accordingly, current trends are such that external strobos are widely in use. The standard course of action in using the external strobo is described as follows. First, options of choice for the use of the external strobo are set. Then, the strobo is plugged in the earphone jack, bearing in mind that the earphone jack is designed to accept a connection from an earphone.

However, considerable inconvenience may be caused by having to go through the same set-up process all over again when using an external strobo. In addition to the above, an electric surge caused by mistakenly choosing options to activate a strobo when an earphone/microphone set is plugged in an earphone jack instead could do extensive damage to a mobile terminal.

SUMMARY

Exemplary embodiments of the present invention provide an apparatus and method for automatically detecting the presence of an external device in a jack of a mobile terminal wherein the external device is automatically enabled without the additional operation of the mobile terminal when plugged into the jack port.

Additional features of the invention will be set forth in the description which follows, and in part will be apparent from the description, or may be learned by practice of the invention.

Exemplary embodiments of the present invention disclose an apparatus for automatically detecting the presence of a strobo in an earphone jack port of a mobile terminal, the apparatus including: a connection unit to electrically connect an earphone/microphone set or a strobo to the mobile terminal and to generate level information if one of an earphone/microphone set or a strobo is connected to the mobile terminal; a sense unit to determine whether the earphone/microphone set or the strobo is electrically connected to the connection unit according to the level information and to generate an indication signal containing a determination result; a main process unit to generate a control signal to control the earphone/microphone set or the strobo according the indication signal; and a strobo control unit to control strobo by receiving the control signal from the main process unit.

Exemplary embodiments of the present invention disclose a method for automatically detecting the presence of a strobo in an earphone jack port of a mobile terminal, the method including the steps of: a) obtaining level information from a connection unit; b) determining whether an earphone/microphone set or a strobo is electrically connected to the connection unit according to the level information; c) enabling a strobo control unit if the strobo is electrically connected to the connection unit as a determination result of step b); and d) enabling the earphone/microphone set control unit if the earphone/microphone set is electrically connected to the connection unit as a determination result of step b).

It is to be understood that both the foregoing general description and the following detailed description are exemplary and explanatory and are intended to provide further explanation of the invention as claimed.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE ILLUSTRATED EMBODIMENTS

Figure 1:
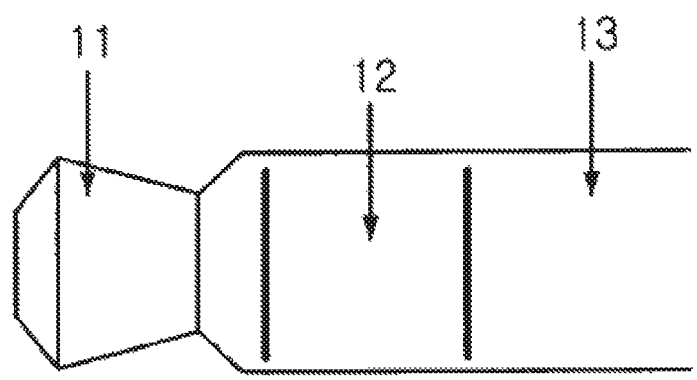
FIG. 1 is a perspective view of an earphone/microphone set plug capable of electrically connecting an earphone/microphone set to an earphone jack in a mobile terminal in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a perspective view of an earphone/microphone set plug capable of electrically connecting an earphone/microphone set to an earphone jack in a mobile terminal in accordance with an embodiment of the present invention.

Referring to FIG. 1, an earphone/microphone set plug includes a microphone end 11, a speaker end 12 and a ground end 13.

The microphone end 11 is designed to transmit a voice signal through the microphone/charge-control signal end of the earphone jack on a mobile terminal with a built-in digital camera. The speaker end 12 receives the voice signal via the speaker/shot control end of the earphone jack on the mobile terminal. The ground end 13 is connected to a ground end of an earphone jack on the mobile terminal.

Figure 2:
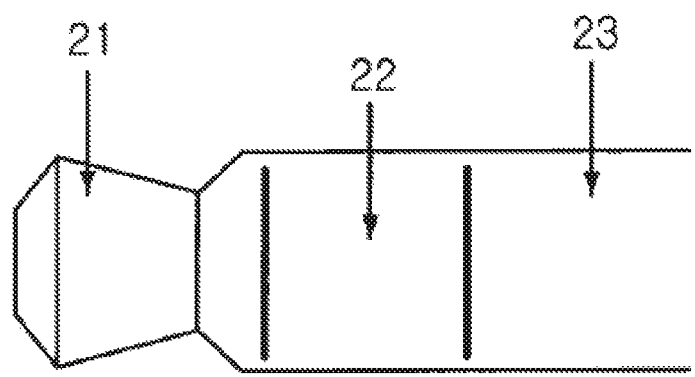
FIG. 2 is a perspective view of a strobo plug to be plugged in an earphone jack in a mobile terminal in accordance with an embodiment of the present invention.

FIG. 2 is a perspective view of a strobo plug to be plugged in an earphone jack in a mobile terminal according to an embodiment of the present invention.

Referring to FIG. 2, the strobo plug includes a charge-control signal end 21, a shot end 22 and a ground end 23.

The charge-control signal end 21 comes into contact with the microphone/charge-control signal end of the earphone jack on the mobile terminal to perform a charging-up process. The shot end 22 receives the shot signal to perform the discharge of electricity. The shot end 22 is controlled by a Mobile Station Modem (MSM) and is connected to the speaker/shot control end of the earphone jack on the mobile terminal. The ground end 23 is connected to the ground end of the earphone jack on the mobile terminal.

Figure 3:
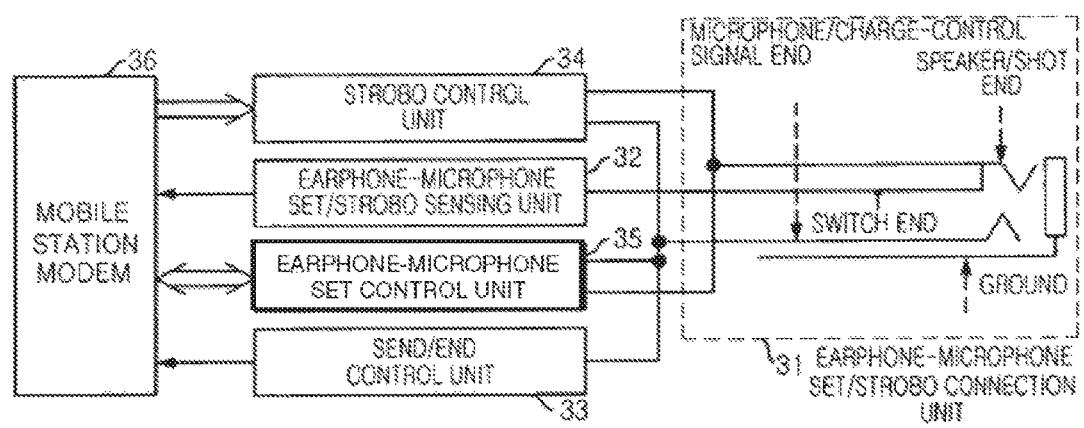
FIG. 3 is a block diagram of an apparatus for automatically detecting the presence of a strobo in an earphone jack port of a mobile terminal in accordance with an embodiment of the present invention.

FIG. 3 is a block diagram of an apparatus for automatically detecting the presence of a strobo in an earphone jack port of a mobile terminal according to an embodiment of the present invention.

Referring to FIG. 3, the apparatus includes an earphone-microphone set/strobo connection unit 31 and an earphone-microphone set/strobo sensing unit 32, a send/end control unit 33 and a mobile station modem 36. The earphone-microphone set/strobo connection unit 31 includes a microphone/charge-control signal end, a speaker/shot end, a switch end and a ground end.

The microphone/charge-control signal end provides a connection to either the charge-control signal end 21 of a strobo plug or the microphone end 11 of an earphone/microphone set plug. The speaker/shot end provides a connection to either the shot end 22 of a strobo plug or the speaker end 12 of an earphone/microphone set plug. The switch end functions as an open-closed switch. The earphone-microphone set/strobo connection unit 31 with a ground end provides a connection to either the ground end 23 of a strobo plug or the ground end 13 of an earphone/microphone set plug. The earphone-microphone set/strobo connection unit 31 functions as a coupling of an earphone/microphone set plug and a strobo plug.

In addition, the apparatus further includes an earphone-microphone set/strobo sensing unit 32, a send/end control unit 33, a strobo control unit 34, an earphone/microphone set control unit 35, and the MSM 36.

The earphone-microphone set/strobo sensing unit 32 detects which of the following, an earphone/microphone set or a strobo, is connected to the earphone-microphone set/strobo connection unit 31, based on the open-closed status of a switch end. The detection result is forwarded to the MSM 36. The send/end control unit 33 processes a signal indicating the beginning and the end of a phone call. The send/end control unit 33 passes the level information on to the MSM 36. The strobo control unit 34 controls a strobo in accordance with either a charge-control signal or a shot signal transmitted from the MSM 36 based on the level information obtained from a microphone/charge-control signal end. The earphone/microphone set control unit 35 redirects a voice signal emitted by the MSM 36 to the speaker end 12 of an earphone/microphone set. Here, upon receiving a signal from the send/end control unit 33, the MSM 36 finds out about when a phone call begins or ends based on the level information. The earphone/microphone set control unit 35 redirects a signal received from a microphone end 11 of the earphone/microphone set to the MSM 36. The MSM 36 receives a signal indicating which of the following, namely an earphone-microphone set or a strobo, is connected to the earphone-microphone set/strobo connection unit 31. Upon receipt of the level information from a send/end control unit 33, the MSM 36 accordingly enables either the strobo control unit 34 or the earphone/microphone set control unit 35.

Figure 4:
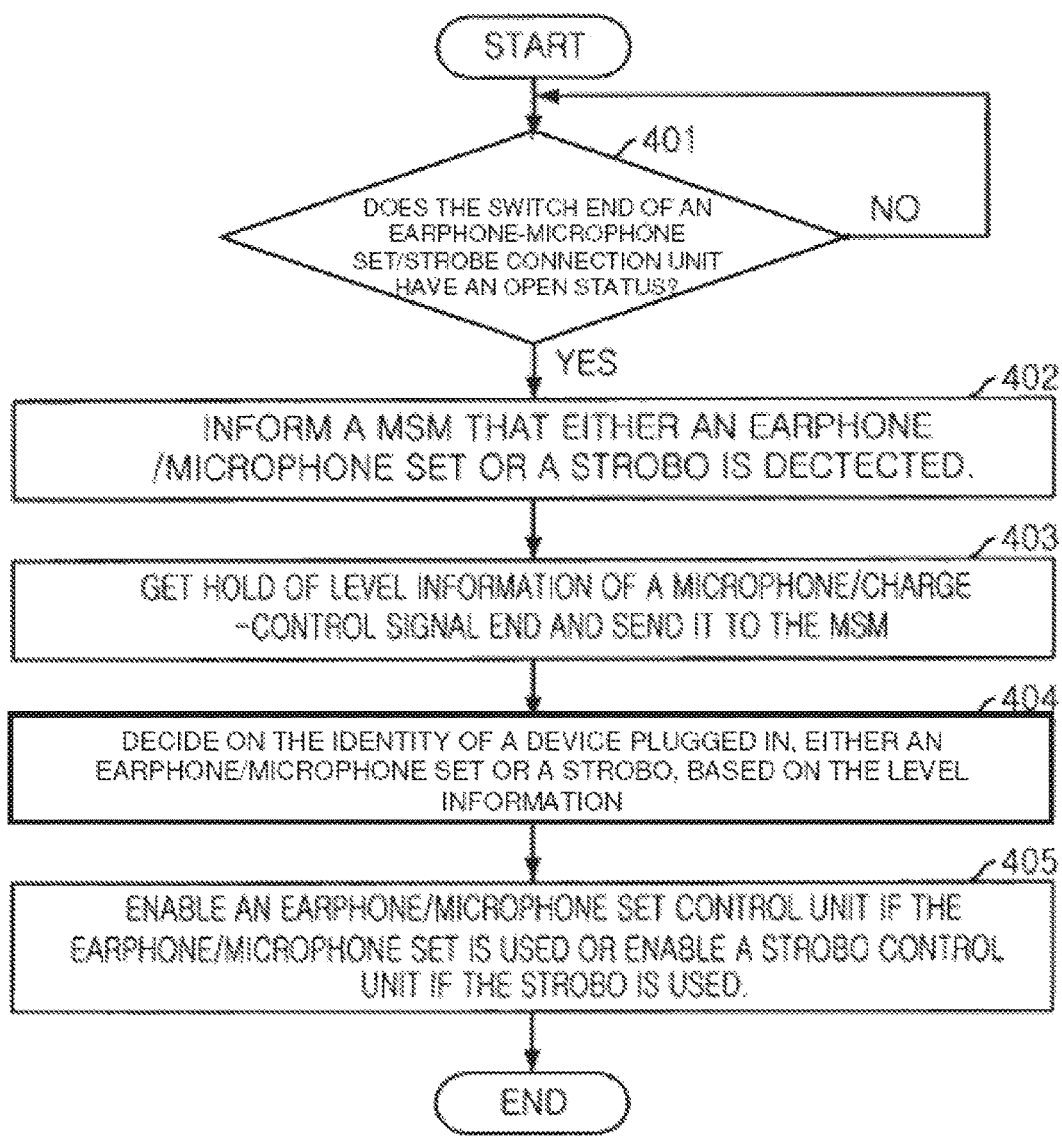
FIG. 4 is a flow chart illustrating a method for automatically detecting the presence of a strobo in an earphone jack port of a mobile terminal in accordance with an embodiment of the present invention.

FIG. 4 is a flow chart illustrating a method for automatically detecting the presence of a strobo in an earphone jack port of a mobile terminal according to an embodiment f the present invention.

First, at step S401, an earphone-microphone set/strobo sensing unit 32 determines if a switch end of an earphone-microphone set/strobo connection unit 31 has an open status. The switch end waits until it has an open status. When neither an earphone/microphone set nor a strobo is present in the earphone jack port, the switch end is said to have a closed status. On the other hand, at step S402, the earphone-microphone set/strobo sensing unit 32 informs the mobile station modem 36 that one of the following, an earphone/microphone set or a strobo, is connected to the earphone-microphone set/strobo connection unit 31.

Then, at step S403, a send/end control unit 33 sends out level information to a mobile station modem 36, where the level information is obtained from the microphone/charge-control signal end of the earphone-microphone set/strobo connection unit 31. Following on from the above, at step S404 the mobile station modem 36 decides on the identity of a device being plugged into the earphone jack port, namely an earphone/microphone set or a strobo, based on the level information obtained from the send/end control unit 33.

Depending on the identity of the device being plugged into the earphone jack port, at step S405, the mobile station modem 36 enables a strobo control unit 34 to control the strobo if a strobo is plugged into the earphone jack port. The mobile station modem 36 enables an earphone/microphone set control unit 35 to control the earphone/microphone set if an earphone/microphone set is plugged.

Here, going into a little more detail about the decision-making methodology used by a mobile station modem 36 at the step S404, the identity of a device being plugged into the earphone jack of the mobile is decided upon based on level information. When a strobo is connected to the earphone-microphone set/strobo connection unit 31, a low level, 0.5 V, results. This is largely due to the impedance characteristic of the interior charge circuit of a strobo. On the contrary, a high level of voltage, DC voltage ranging from 2.7V to 3.0V, results if an earphone/microphone set is plugged into the earphone jack port.

Assume that the identity of a device connected to the earphone-microphone set/strobo connection unit 31 is found to be an earphone-microphone set. Assume that a user enables the send/end control unit 33 so as to make a phone call, thereby sending out signals carrying a low level status to a mobile station modem 36.

Upon receipt of a signal with a low level status, the mobile station modem 36 enables the earphone/microphone set control unit 35 without being misled into enabling the strobo control unit 34. This is largely owing to the fact that the mobile station modem 36 is already aware that an earphone-microphone set/strobo connection unit 31 is connected with an earphone-microphone set.

In addition, the embodiments can be applied to a mobile terminal in such a way that a user may make a phone call using the built-in speaker and the built-in microphone of the mobile terminal and an earphone-microphone set.

As described above, the use of a strobo is enabled via the earphone jack of a mobile terminal while being compatible with a mobile terminal in relation to making a phone call through a built-in speaker and a built-in microphone thereof as well as an earphone/microphone set.

The mobile terminal may be safeguarded against severe damage being done thereto by mistakenly choosing options to activate a strobo without knowing that an earphone/microphone set is plugged in the earphone jack of a mobile terminal.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus to control an external device, comprising:
   a connector configured to electrically connect with the external device;
   a detector configured to determine whether the external device is electrically connected to the connector;
   a controller configured to obtain voltage level information corresponding to the external device from the connector and determine a type of the external device based on the voltage level information, wherein the voltage level information is different according to the type of the external device; and
   an external device controller configured to enable the external device automatically based on the type of the external device when the external device is electrically connected,
   wherein the detector determines whether the external device is electrically connected to the connector based on a status of a switch end of the connector.

2. The apparatus of claim 1, wherein the status of the switch end indicates any one of a plurality of statuses including an open status of the switch end.

3. The apparatus of claim 1, wherein the connector is electrically connected with an earphone jack port of the apparatus.

4. A method of controlling an external device, comprising:
   electrically connecting with the external device;
   determining whether the external device is electrically connected;
   obtaining voltage level information corresponding to the external device;
   determining a type of the external device based on the voltage level information, wherein the voltage level information is different according to the type of the external device; and
   enabling the external device automatically based on the type of the external device when the external device is electrically connected,
   wherein determining whether the external device is electrically connected includes determining whether the external device is electrically connected to the connector based on a status of a switch end of a connector configured to electrically connect with the external device.

5. The method of claim 4, wherein the status of the switch end indicates any one of a plurality of statuses including an open status of the switch end.

6. The method of claim 4, wherein the external device is electrically connected with an earphone jack port.

* * * * *